United States Patent [19]

Onishi et al.

[11] Patent Number: 4,815,553

[45] Date of Patent: Mar. 28, 1989

[54] CRUISE CONTROL APPARATUS FOR AN AUTOMOTIVE ENGINE

[75] Inventors: Masayoshi Onishi; Takeshi Yasukawa, both of Himeji, Japan

[73] Assignee: Mitsubishi Denki Kabushiki Kaisha, Japan

[21] Appl. No.: 84,902

[22] Filed: Aug. 13, 1987

[30] Foreign Application Priority Data

Aug. 18, 1986 [JP] Japan .................... 61-193122
Aug. 19, 1986 [JP] Japan .................... 61-194271
Oct. 22, 1986 [JP] Japan .................... 61-252318

[51] Int. Cl.$^4$ ............................................ B60K 27/00
[52] U.S. Cl. ..................................... 180/178; 123/361
[58] Field of Search .................. 180/178, 179, 170; 123/352, 361

[56] References Cited

U.S. PATENT DOCUMENTS

| | | | |
|---|---|---|---|
| 4,132,284 | 1/1979 | Tomecek | 180/179 |
| 4,192,398 | 3/1980 | Hunt | 180/178 |
| 4,202,424 | 5/1980 | Sakakibara et al. | 180/176 |
| 4,380,799 | 4/1983 | Allard et al. | 180/178 X |
| 4,385,675 | 5/1983 | Blee | 180/178 |

*Primary Examiner*—David M. Mitchell
*Assistant Examiner*—Michael Mar
*Attorney, Agent, or Firm*—Leydig, Voit & Mayer

[57] ABSTRACT

A cruise control apparatus for an automotive engine has an actuator with a moving output member whose movement adjusts the opening of a throttle valve so as to maintain the speed of the automobile at a desired speed. The motion of the output member is converted into linear motion by a motion converter whose speed of motion varies with the degree of the automobile. The speed of throttle valve opening therefore varies with the speed of the automobile and a desired speed so as to provide good responsiveness. In a preferred embodiment, the motion converter is a cylindrical cam which is rotated by the actuator and which has a helical groove with a varying pitch. The rotation of the cylindrical cam causes the linear movement of a sliding block connected with the throttle valve. In another preferred embodiment, the motion converter is a pulley with a variable radius and rotated by the actuator. The rotation of the pulley operates the throttle valve through a wire cable.

2 Claims, 3 Drawing Sheets ized actuator, is not suitable for sports cars or passenger cars.

CRUISE CONTROL APPARATUS FOR AN AUTOMOTIVE ENGINE

BACKGROUND OF THE INVENTION

This invention relates to a cruise control apparatus for an automotive engine. More specifically, it relates to a cruise control apparatus of the type which maintains the speed of an automobile by controlling the throttle valve of the carburetor.

A cruise control apparatus is a device which enables a driver to maintain the speed of an automobile at a desired level without his having to use the accelerator pedal. One type of cruise control apparatus maintains the vehicle speed by controlling the degree of opening of the throttle valve of the engine. In this type of apparatus, the throttle valve is adjusted by a motorized or vacuum-operated actuator through a wire cable and a link mechanism, and the actuator is controlled based on a speed-dependent electrical signal from the speedometer.

In a cruise control apparatus with a motorized actuator, the actuator comprises a motor having a rotating output shaft on which a pulley is mounted. A wire cable which is wrapped around the pulley is connected with the throttle valve of the engine through a link mechanism. The rotation of the output shaft causes the wire cable to open or close the throttle valve, depending on the direction of rotation. The speed of rotation of the output shaft of the actuator is dependent on the electrical power supply for the engine, which is substantially constant over the entire range of engine operation. Therefore, the speed of movement of the throttle valve is substantially constant, regardless of the speed of the vehicle. A graph of the speed of opening of a throttle valve as a function of vehicle speed for a conventional cruise control apparatus with a motorized actuator is therefore a straight horizontal line, as shown by curve A of FIG. 5.

On the other hand, a vacuum-type actuator has a diaphragm which is caused to reciprocate by vacuum from the intake manifold. The diaphragm is connected to the throttle valve by a tension member such as a cable and a link mechanism. The speed of movement of the diaphragm, and thus the speed of opening of the throttle valve, depends on the magnitude of the vacuum in the intake manifold, the orifice diameter of control valves for the actuator, and a number of other factors, but in general, it increases nonlinearly as the intake manifold vacuum increases.

While a constant speed of throttle valve opening over the entire range of vehicle speed, such as is provided by a cruise control apparatus with a motorized actuator, is satisfactory for a commercial vehicle with a heavy load, it is not suitable for sports cars or passenger cars. In order to obtain the responsiveness desired of a sports car, the speed of throttle opening should increase linearly with increasing vehicle speed up to a fairly high vehicle speed. In a higher speed range, the speed of throttle opening should gradually and nonlinearly increase to a maximum, while in a still higher speed range, it should gradually and nonlinearly decrease from the maximum. The preferable operating characteristics of a cruise control apparatus for a sports car are illustrated by curve C of FIG. 5, which plots the speed of throttle valve opening as a function of vehicle speed. The operating characteristics for a passenger car should be similar, as shown by curve B of FIG. 5. However, as a passenger car requires less responsiveness than a sports car, the region of linearly increasing throttle valve opening speed is narrower than for a sports car, and the maximum speed of throttle valve opening is less.

Unfortunately, it is extremely difficult to obtain the operating characteristics illustrated by curves B and C using a conventional cruise control apparatus having a motorized or vacuum-type actuator, and the responsiveness of sports car or passenger car with a conventional cruise control apparatus is unsatisfactory.

SUMMARY OF THE INVENTION

Accordingly, it is an object of the present invention to provide a cruise control apparatus for an automotive engine which can vary the speed of opening of the throttle valve of the engine in accordance with the vehicle speed so as to provide the responsiveness which is desired of a sports car or a passenger car.

It is another object of the present invention to provide a cruise control apparatus which can be easily adapted to various types of automobiles.

A cruise control apparatus in accordance with the present invention has an actuator with a moving output member whose motion opens and closes the throttle valve of the engine of the vehicle. The actuator is controlled by a controller based on the actual speed of the vehicle and a preset speed so as to maintain the vehicle speed at the preset speed. The motion of the output member of the actuator is converted into linear motion by a motion converting means. The speed of the linear motion which is produced by the motion converting means, and thus the speed of opening of the throttle valve of the engine, varies with the speed of the vehicle and can be made to vary in accordance with the type of vehicle.

The actuator may be a motorized actuator in which the moving output member is a rotating output shaft, or it may be a vacuum-type actuator in which the moving output member undergoes linear motion.

In one preferred embodiment, the actuator is in the form of a motorized actuator, and the motion converting means comprises a cylindrical cam which is rotated by the actuator. The cylindrical cam has a helical groove formed therein, and a sliding member engages with the helical groove and is made to linearly reciprocate by the rotation of the cylindrical cam. The sliding member is connected to the throttle valve of the engine by a wire cable. The pitch of the helical groove varies along its length, whereby the speed of the linear movement of the sliding body and thus the speed of opening of the throttle valve vary with the speed of the automobile.

In another preferred embodiment, the actuator is in the form of a motorized actuator, and the motion converting means comprises a pulley which is mounted on the output shaft of the actuator and which is connected to the throttle valve by a wire cable which is wrapped around the pulley. The pulley has a varying radius, whereby the speed of movement of the wire cable and thus the speed of opening of the throttle valve will vary with the speed of the automobile.

BRIEF DESCRIPTION OF THE DRAWINGS

In the figures, the same reference numerals indicate the same or corresponding parts.

DESCRIPTION OF THE PREFERRED EMBODIMENTS

Figure 1:
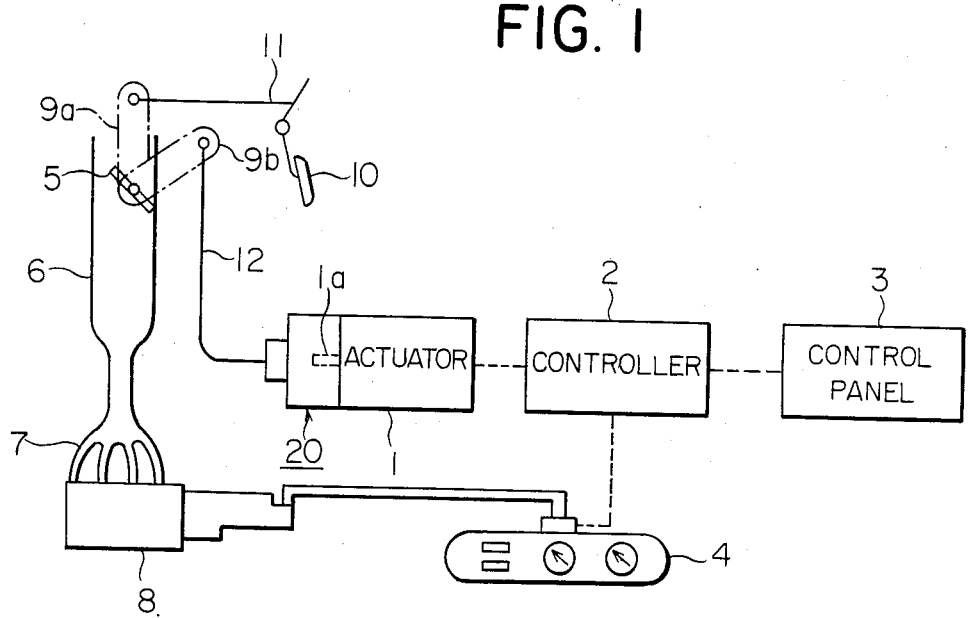
FIG. 1 is a schematic view of a first embodiment of a cruise control apparatus in accordance with the present invention.

Hereinbelow, a number of preferred embodiments of a cruise control apparatus in accordance with the present invention will be described while referring to the accompanying drawings, FIG. 1 of which schematically illustrates a first embodiment. As shown in this figure, this embodiment has a motorized actuator 1 which contains an unillustrated electric motor which drives the rotating output shaft 1a of the actuator 1 through an unillustrated worm reduction gear. The operation of the actuator 1 is controlled by a controller 2 which is responsive to an electrical input signal from a control panel 3 on which the driver of the vehicle sets a desired vehicle speed, and an electrical input signal from a speedometer 4, which indicates the actual speed of the vehicle. A throttle valve 5 is pivotably mounted in the carburetor barrel 6 of the engine which is connected to the body 8 of the engine via an intake manifold 7. The throttle valve 5 is connected to an accelerator pedal 10 by a link 9a and a wire cable 11. It is also connected to a motion converter 20 through another link 9b and a wire cable 12. The motion converter 20 constitutes means for converting the motion of the output shaft 1a of the actuator 1 into linear motion whose speed varies with the speed of the vehicle in a desired manner.

Figure 2:
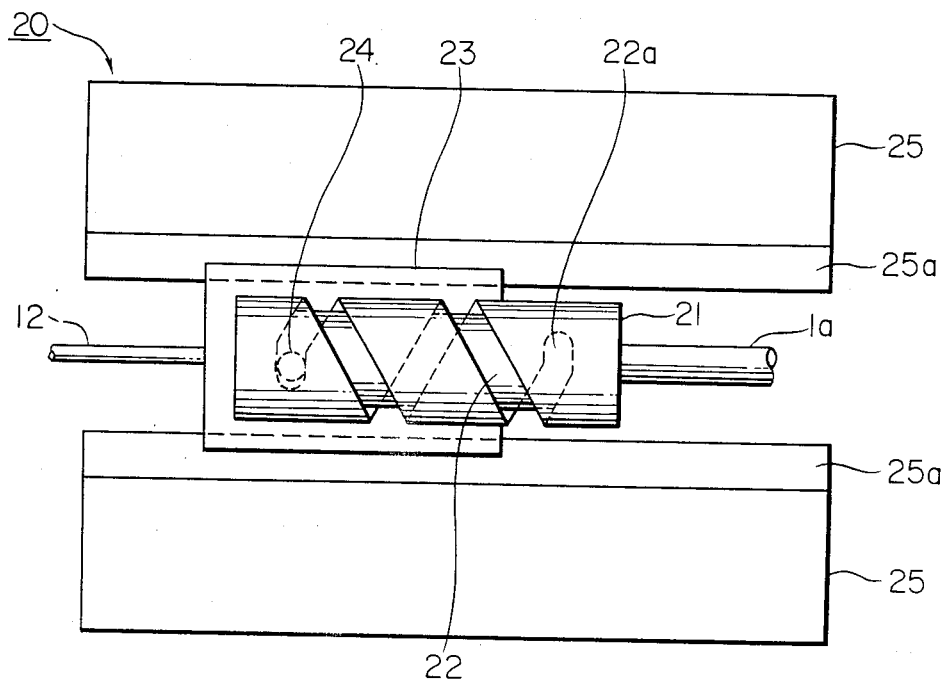
FIG. 2 is an enlarged plan view of the motion converter of the embodiment of FIG. 1.

FIG. 2 illustrates the structure of the motion converter 20 in detail. It has a cylindrical cam 21 rigidly secured to the output shaft 1a of the actuator 1 so as to rotate therewith. The cam 21 has a helical groove 22 of varying pitch formed in its outer surface. At its ends, the groove 22 has two straight end sections 22a which extend circumferentially partway around the cam 21. A sliding block 23 is slidably supported by two parallel guides 25a formed on a pair of bases 25 which form part of the motion converter 20. The sliding block 23 has an upwardly-extending pin 24 secured to its upper surface which engages with the helical groove 22 of the cylindrical cam 21 so that when the cylindrical cam 21 is rotated by the output shaft 1a of the actuator 1, the sliding block 23 will be made to move linearly along the guides 25a. One end of wire cable 12 is secured to the sliding block 23 so that the motion of the sliding block 23 is transmitted to throttle link 9b. The distance between the two end sections 22a of the helical groove 22 determines the maximum stroke of the sliding block 23. The angle of rotation of the output shaft 1a and thus the longitudinal position of the sliding block 23 depends on the speed of the vehicle. At low vehicle speeds, the sliding block 23 is positioned near the left end of the cylindrical cam 21 in FIG. 2, while at high speeds it moves towards the right end of the cylindrical cam 21.

By suitably varying the pitch of the helical groove 22, the speed of opening of the throttle valve 5 can be controlled in accordance with the speed of the vehicle in any desired manner. For example, if the pitch linearly or nonlinearly increases along the length of the cam 21 from left to right in FIG. 2, the speed of throttle valve opening will linearly or nonlinearly increase, respectively, with increasing vehicle speed. On the other hand, if the pitch decreases in a linear or nonlinear manner along the length of the cam 21 from left to right, the speed of throttle opening will linearly or nonlinearly decrease, respectively, with increasing vehicle speed. Furthermore, if the pitch remains constant, the speed of throttle valve opening will be independent of the vehicle speed.

Figure 5:
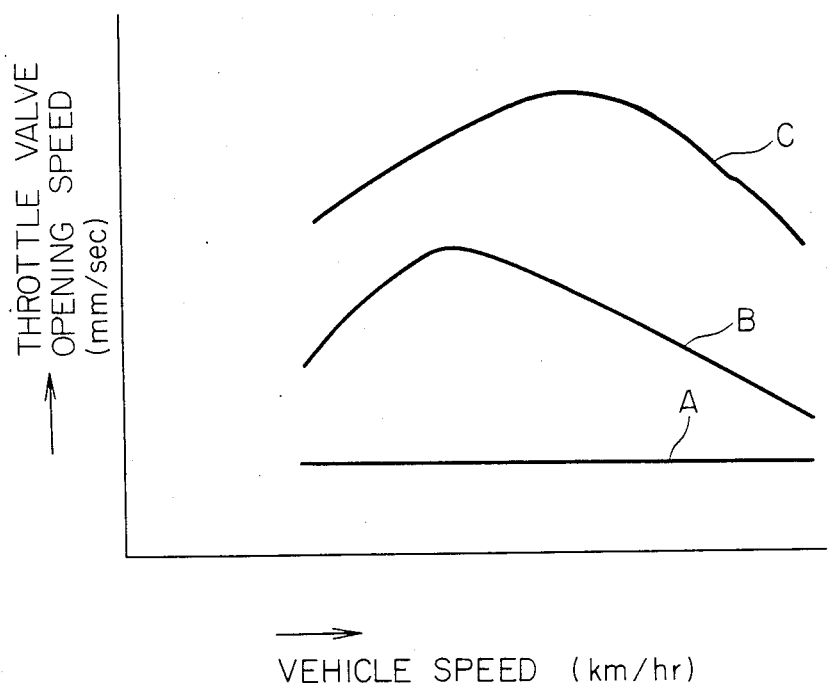
FIG. 5 is a graph showing the speed of throttle valve opening as a function of vehicle speed for various types of automobiles.

Thus, if the helical groove 22 of the cylindrical cam 21 is made to have a section of linearly increasing pitch, a section of nonlinearly increasing pitch, and a section of nonlinearly decreasing pitch, the speed of throttle valve opening can be made to first linearly increase then nonlinearly and gradually increase to a maximum and then nonlinearly and gradually decrease from the maximum in the manner shown by curves B and C of FIG. 5. In other words, the operating characteristics which are suitable for a sports car (curve C) or a passenger car (curve B) can be easily obtained by the present invention. Furthermore, if the pitch of the helical groove 22 is constant, a cruise control apparatus having the operating characteristics which are suitable for a commercial vehicle (curve A of FIG. 5) can be obtained.

Figure 3:
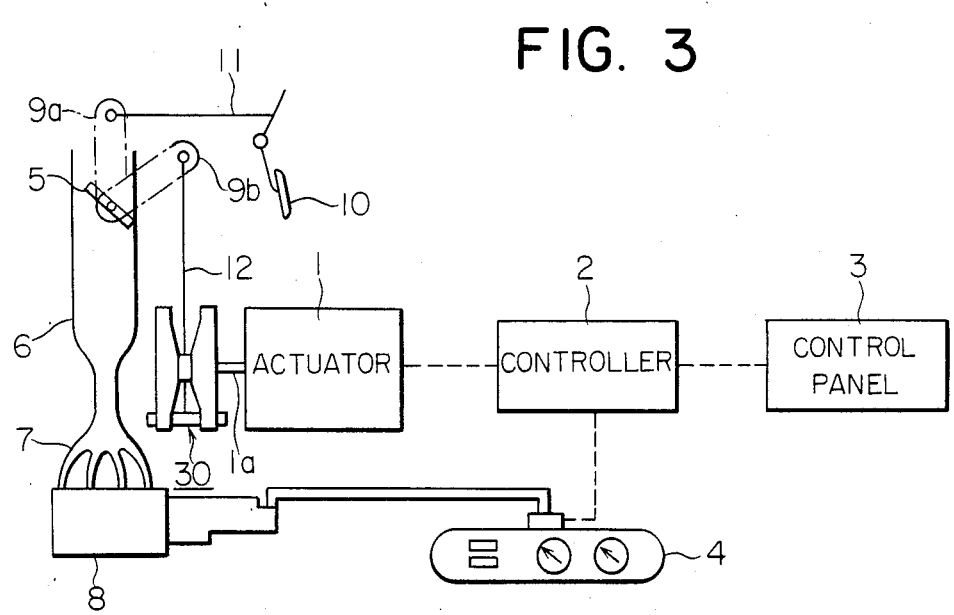
FIG. 3 is a schematic view of a second embodiment of the present invention.
Figure 4:
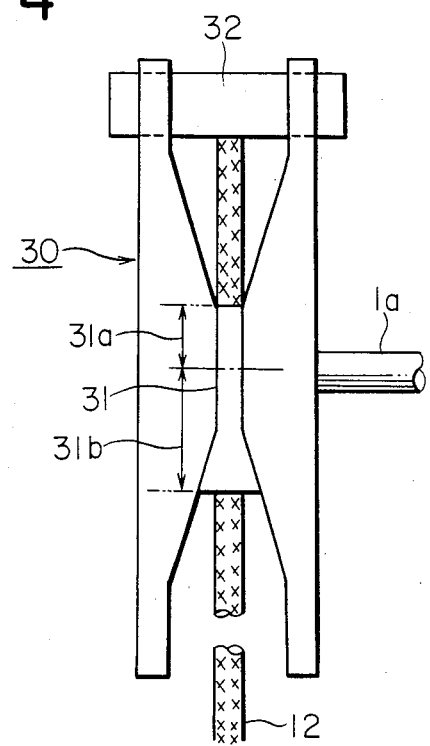
FIG. 4 is an enlarged front view of the drive pulley of the embodiment of FIG. 3.

FIG. 3 schematically illustrates another embodiment of a cruise control apparatus in accordance with the present invention. The overall structure of this embodiment is similar to that of the previous embodiment, but it differs in that a motion converting means is in the form of a drive pulley 30 of varying radius which is secured to the output shaft 1a of a motorized actuator 1 so as to rotate therewith. As shown in detail in FIG. 4, which is an enlarged front view of the drive pulley 30, it has a pulley core 31 of varying radius around which a wire cable 12 is wrapped. One end of the wire cable 12 is secured to an anchor bar 32 which is secured to the sides of the drive pulley 30, while the other end of the wire cable 12 is secured to a throttle link 9b in the same manner as in the previous embodiment. The radius 31a of the pulley core 31 at the point where the wire cable 12 first contacts it is less than the radius 31b at the point where it last contacts the core 31. When the drive pulley 30 is rotated by the actuator 1, the wire cable 12 is reeled in or out by the drive pulley 30, and the throttle valve 5 is opened or closed thereby.

As the output shaft 1a of the motorized actuator 1 rotates at a constant rate, the linear speed of the wire cable 12 and thus the speed of opening of the throttle valve 5 is directly proportional to the radius of the pulley core 31 at the point where the wire cable 12 loses contact therewith. Accordingly, by suitably varying the radius of the pulley core 31, the speed of opening of the throttle valve 5 can be controlled in accordance with vehicle speed in any desired manner. For example, if the radius of the pulley core 31 linearly increases along the circumference of the drive pulley 30, the speed of throttle valve opening will linearly increase as the vehicle speed increases, and if the radius nonlinearly decreases along the circumference, the speed of throttle valve opening will nonlinearly decrease as the vehicles speed increases. Furthermore, if the pulley radius is constant, the speed of throttle valve opening will also be constant. Therefore, if between radius 31a, corresponding to a low vehicle speed, and radius 31b, corresponding to a high vehicle speed, the pulley core 31 has a section of linearly increasing radius, a section of nonlinearly increasing radius, and a section of nonlinearly decreasing radius, the speed of throttling valve opening can be made to first linearly increase then nonlinearly increase to a maximum and then nonlinearly decrease with increasing vehicle speed. Thus, a cruise control apparatus which has the operating characteristics which are illustrated by curve B (for a passenger car) and curve C (for a sports car) of FIG. 5 can be easily obtained.

In both of the above-described embodiments, the actuator 1 is a motorized actuator 1 with a rotating output shaft 1a whose speed is substantially constant regardless of vehicle speed. However, a cruise control apparatus in accordance with the present invention may also employ a vacuum-type actuator having a linearly reciprocating output member whose speed of motion nonlinearly varies with vehicle speed. When employing such an actuator, the output member of the actuator can be connected to a motion converting means comprising a cylindrical cam 21 like that of FIG. 1 or a variable-radius drive pulley 30 like that of FIG. 3 which is further equipped with a suitable member for converting the linear motion of the output member of the actuator into rotational motion for rotating the cylindrical cam or the drive pulley.

What is claimed is:

1. An automobile cruise control apparatus comprising:

an actuator having an output member which is rotatable by said actuator;

a motion converting cylindrical cam which is rotated by said output member for converting movement of said output member of said actuator into linear motion whose speed varies in accordance with speed of an automobile, said cylindrical cam having a helical groove of varying pitch with a first section whose pitch linearly increases along said cylindrical cam, a second section whose pitch nonlinearly increases along said cylindrical cam, and a third section whose pitch nonlinearly decreases along said cylindrical cam, the speed of the linear motion increasing substantially linearly in a first speed range of the automobile which corresponds to said first section of said cylindrical cam, the speed of the linear motion increasing nonlinearly in a second speed range of the automobile which is greater than the first speed range and which corresponds to said second section of said cylindrical cam, and the speed of the linear motion decreasing nonlinearly in a third speed range of the automobile which is greater than the second speed range and which corresponds to said third section of said cylindrical cam;

a linearly sliding member having an engaging portion which engages with said helical groove of said cylindrical cam and transmits movement of said cylindrical cam to a throttle valve of the automobile so that the rotation of said cylindrical cam causes the throttle valve of the automobile to open and close;

means for setting a desired speed at which the automobile is to maintained; and control means responsive to the speed of the automobile and the desired speed of the automobile for controlling movement of said output member of said actuator so that the linear motion converted by said motion converting cylindrical cam is transmitted to the throttle valve so as to vary the speed of opening of the throttle valve in accordance with the speed of the automobile and such that the speed of the automobile is maintained at the desired speed.

2. An automobile cruise control apparatus comprising:

a motorized actuator having an output shaft which is rotatable by said actuator;

a motion converting pulley which is rotated by said output shaft for converting movement of said output shaft of said actuator into linear motion whose speed varies in accordance with speed of an automobile, said pulley having a first circumferential section having a radius which linearly increases along the circumference thereof, a second circumferential section having a radius which nonlinearly increases along the circumference thereof, and a third circumferential section having a radius which nonlinearly decreases along the circumference thereof, the speed of the linear motion increasing substantially linearly in a first speed range of the automobile which corresponds to said first circumferential section of said pulley, the speed of the linear motion increasing nonlinearly in a second speed range of the automobile which is greater than the first speed range and which corresponds to said second circumferential section of said pulley, and the speed of the linear motion decreasing nonlinearly in a third speed range of the automobile which is greater than the second speed range and which corresponds to said third circumferential section of said pulley;

a throttle link which is connected to a throttle valve of the automobile and a flexible tension member having one end which is wrapped around the circumference of said pulley and another end which is connected to the throttle link so that the rotation of said pulley causes the throttle valve of the automobile to open and close;

means for setting a desired speed at which the automobile is to maintained; and control means responsive to the speed of the automobile and the desired speed of the automobile for controlling movement of said output shaft of said actuator so that the linear motion converted by said motion converting pulley is transmitted to the throttle valve so as to vary the speed of opening of the throttle valve in accordance with the speed of the automobile and such that the speed of the automobile is maintained at the desired speed.

* * * * *